United States Patent
Jeong et al.

(10) Patent No.: US 11,850,938 B2
(45) Date of Patent: Dec. 26, 2023

(54) IN-WHEEL DRIVING APPARATUS AND VEHICLE INCLUDING THE SAME

(71) Applicant: HYUNDAI MOBIS CO., LTD., Seoul (KR)

(72) Inventors: Ui Il Jeong, Yongin-si (KR); Yeong Woo Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/383,203

(22) Filed: Jul. 22, 2021

(65) Prior Publication Data
US 2022/0024302 A1    Jan. 27, 2022

(30) Foreign Application Priority Data

Jul. 22, 2020 (KR) .................. 10-2020-0091212
Jul. 23, 2020 (KR) .................. 10-2020-0091930

(51) Int. Cl.
| | |
|---|---|
| *B60K 17/04* | (2006.01) |
| *B60K 7/00* | (2006.01) |
| *F16H 57/04* | (2010.01) |
| *F16H 1/46* | (2006.01) |
| *F16H 57/031* | (2012.01) |
| *F16H 57/02* | (2012.01) |

(52) U.S. Cl.
CPC .......... *B60K 17/046* (2013.01); *B60K 7/0007* (2013.01); *F16H 57/043* (2013.01); *F16H 57/0436* (2013.01); *F16H 57/0479* (2013.01); *F16H 57/0486* (2013.01); *F16H 1/46* (2013.01); *F16H 57/031* (2013.01); *F16H 2057/02034* (2013.01); *F16H 2057/02043* (2013.01)

(58) Field of Classification Search
CPC . B60K 17/046; F16H 57/043; F16H 57/0479; F16H 57/0482; F16H 57/0486
See application file for complete search history.

(56) References Cited

U.S. PATENT DOCUMENTS 9,726,057 B2 * 8/2017 Yamauchi ................ F01M 1/02

FOREIGN PATENT DOCUMENTS

CN        205479154 U    8/2016

OTHER PUBLICATIONS

Office Action issued in corresponding Chinese Patent Application No. 2021216812300 dated Dec. 7, 2021, with English translation.

\* cited by examiner

*Primary Examiner* — Derek D Knight
(74) *Attorney, Agent, or Firm* — MORGAN, LEWIS & BOCKIUS LLP

(57) ABSTRACT

According to the present disclosure, an in-wheel driving apparatus includes a first planetary gear reducer, into which oil is introduced, and a flow passage is formed in an interior of the first planetary gear reducer such that the oil introduced into the first planetary gear reducer flows in an introduction direction, and flows in a direction that is opposite to the introduction direction thereafter.

18 Claims, 5 Drawing Sheets

IN-WHEEL DRIVING APPARATUS AND VEHICLE INCLUDING THE SAME

CROSS-REFERENCE TO RELATED APPLICATION

This application claims the benefit of priority to Korean Patent Application No. 10-2020-0091212, filed in the Korean Intellectual Property Office on Jul. 22, 2020, and Korean Patent Application No. 10-2020-0091930, filed in the Korean Intellectual Property Office on Jul. 23, 2020, the entire contents of which are incorporated herein by reference.

TECHNICAL FIELD

The present disclosure relates to an in-wheel driving apparatus and a vehicle including the in-wheel driving apparatus.

BACKGROUND

In general, an in-wheel driving apparatus relates to a technology used in a vehicle, such as an electric vehicle, which employs electricity as a power source, and unlike a scheme of rotating wheels via transmission of power through an engine-transmission-driving shaft mechanism in a gasoline or diesel vehicle, directly drives wheels with motors disposed in the interiors of the rims of wheels.

The in-wheel apparatus requires a flow passage structure, in which oil may circulate such that a motor, a reducer, and the like may be directly cooled and lubricated. Accordingly, it is necessary to provide a path of the flow passage as short as possible and form the flow passage such that the flow passage may show a maximum cooling/lubricating efficiency.

However, the conventional in-wheel apparatus has many restrictions on constitution of a package and thus the flow passage structure is complex, so that the manufacturing process thereof is also complex.

SUMMARY

The present disclosure has been made to solve the above-mentioned problems occurring in the prior art while advantages achieved by the prior art are maintained intact.

An aspect of the present disclosure provides an in-wheel driving apparatus that has a flow passage structure, in which oil may flow efficiently, and may supply a constant amount of oil to planetary gear reducers.

Another aspect of the present disclosure is to provide a structure, in which oil that is introduced into an interior of a reducer of an in-wheel system to perform cooling and lubrication functions may circulate, to allow the oil to be smoothly reused.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an in-wheel driving apparatus includes a first planetary gear reducer, into which oil is introduced, and a flow passage is formed in an interior of the first planetary gear reducer such that the flow passage may be configured such that the oil introduced into the first planetary gear reducer flows in an introduction direction, and flows in a direction that is opposite to the introduction direction thereafter.

In another embodiment, the in-wheel driving apparatus may further include a first shaft that transmits power to the first planetary gear reducer, and including a first flow passage, into which the oil is introduced, formed therein. The first planetary gear reducer may include a sun gear coupled to an outer side of the first shaft and that receives the power from the first shaft to be rotated, a planetary gear engaged with the sun gear, including a second shaft that is parallel to the first shaft, and that revolves along an outer circumference of the sun gear while rotating about the second shaft, and a carrier coupled to the second shaft, and that rotates in conjunction with the revolution of the second shaft.

In another embodiment, the in-wheel driving apparatus may further include a second flow passage communicated with the first flow passage and formed on one side of the carrier, the carrier may include a carrier interior space communicated with the second flow passage, and a portion of the oil introduced from the first flow passage to the second flow passage may be introduced into the carrier interior space.

In another embodiment, the carrier may further include a first bearing disposed in the carrier interior space, and a portion of the oil introduced from the first flow passage to the second flow passage may be introduced into the first bearing.

In another embodiment, the second shaft may include a third flow passage communicated with the second flow passage, and the oil discharged from the second flow passage is introduced into the third flow passage.

In another embodiment, the first planetary gear reducer may further include a second bearing disposed on an outer side of the second shaft, and the oil discharged from the third flow passage may be introduced into the second bearing.

In another embodiment, the second shaft further includes a fourth flow passage communicated with the third flow passage and extending along a lengthwise direction of the second shaft, and a fifth flow passage communicated with the fourth flow passage, and that guides the oil discharged from the fourth flow passage to the second bearing, a first direction, in which the oil passes through the first flow passage, and a second direction, in which the oil passes through the fourth flow passage, are opposite to each other, and the third flow passage is inclined in a direction that faces the fifth flow passage.

In another embodiment, the fifth flow passage may extend from one end thereof in a direction, in which the fourth flow passage extends, and a portion of the oil discharged from the fifth flow passage may be introduced into the second bearing in a direction that is parallel to the first direction, and a portion of the oil discharged from the fifth flow passage may be introduced into the second bearing in a direction that is parallel to the second direction.

In another embodiment, the in-wheel driving apparatus may further include an oil pump that discharges the oil, a second planetary gear reducer disposed on one side of the first planetary gear reducer, a main line, into which the oil discharged from the oil pump is introduced, a first line communicated with the main line and that supplies the oil to the first planetary gear reducer, and a second line communicated with the main line and that supplies the oil to the second planetary gear reducer, a diameter of the first line may be smaller than a diameter of the second line, a direction, in which the main line extends, and a direction, in which the first line extends, may be parallel to each other, and the second line may extend in a direction that crosses the direction, in which the main line extends.

According to another aspect of the present disclosure, an in-wheel driving apparatus includes a first planetary gear reducer, and a cover having one side which faces the first planetary gear reducer. The cover includes a flow passage hole formed therein and passing through opposite surfaces of the cover, and the first planetary gear reducer is communicated with an opposite side of the one side of the cover by the flow passage hole formed in the cover.

In another embodiment, the in-wheel driving apparatus may further include a transfer gear extending in a widthwise direction (W) of the in-wheel driving apparatus, and passing through the cover, wherein a gear hole, through which the transfer gear passes, is formed in the cover, wherein a gear flow passage extending along the widthwise direction (W) is formed in an interior of the transfer gear, and the gear flow passage may be communicated with the flow passage hole, and is spaced apart from the flow passage hole in a radial direction (R) of the in-wheel driving apparatus.

In another embodiment, the first planetary gear reducer may include a first sun gear coupled to an outer surface of the transfer gear, a plurality of planetary gears disposed on an outer side of the first sun gear and engaged with the first sun gear, a first carrier coupled to the plurality of first planetary gears and that faces the transfer gear, and a carrier bearing disposed in an interior of the first carrier. The transfer gear and the first carrier may be spaced apart from each other in the widthwise direction (W) to form a spacing flow passage space therebetween, the gear flow passage may be communicated with the flow passage hole through the spacing flow passage space, and the carrier bearing may face the gear flow passage while the spacing flow passage space being interposed therebetween.

In another embodiment, a storage space may be formed in an outer area of the transfer gear in the radial direction (R), in an area that faces the opposite side of the cover, and the spacing flow passage space may be communicated with the storage space through the flow passage hole.

In another embodiment, the in-wheel driving apparatus may further include a circumscribed gear engaged with the transfer gear on an outer side of the transfer gear, and a housing accommodating the circumscribed gear, and the storage space is formed in an interior of the housing.

In another embodiment, the in-wheel driving apparatus may further include a second planetary gear reducer coupled to the circumscribed gear, the second planetary gear reducer may include a second carrier, and the circumscribed gear may be coupled to the second carrier.

In another embodiment, the first planetary gear reducer may include a rotary shaft disposed in an inner side of the first planetary gear, and a first rotary shaft flow passage extending in the widthwise direction (W) and formed in an interior of the rotary shaft.

In another embodiment, the first planetary gear reducer may further include a planetary gear bearing disposed between the first planetary gear and the rotary shaft in the radial direction (R), and wherein an interior of the planetary gear bearing is communicated with the flow passage hole and the first rotary shaft flow passage.

In another embodiment, the in-wheel driving apparatus may further include a second rotary shaft flow passage that communicates the first rotary shaft flow passage and the interior space of the planetary gear bearing and that is formed in an interior of the rotary shaft, and one end of the second rotary shaft flow passage may face a central area of the planetary gear bearing in the widthwise direction (W).

In another embodiment, the in-wheel driving apparatus may further include a third rotary shaft flow passage disposed between the first rotary shaft flow passage and the spacing flow passage space and that communicates the first rotary shaft flow passage and the spacing flow passage space, and the third rotary shaft flow passage may extend obliquely with respect to the radial direction (R) and the widthwise direction (W).

According to another aspect of the present disclosure, a vehicle includes a wheel, and an in-wheel driving apparatus disposed in the wheel, the in-wheel driving apparatus includes a first planetary gear reducer, and a cover having one side which faces the first planetary gear reducer. The cover includes a flow passage hole formed therein and passing through opposite surfaces of the cover is formed in the cover, and the first planetary gear reducer is communicated with an opposite side of the one side of the cover by the flow passage hole formed in the cover.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
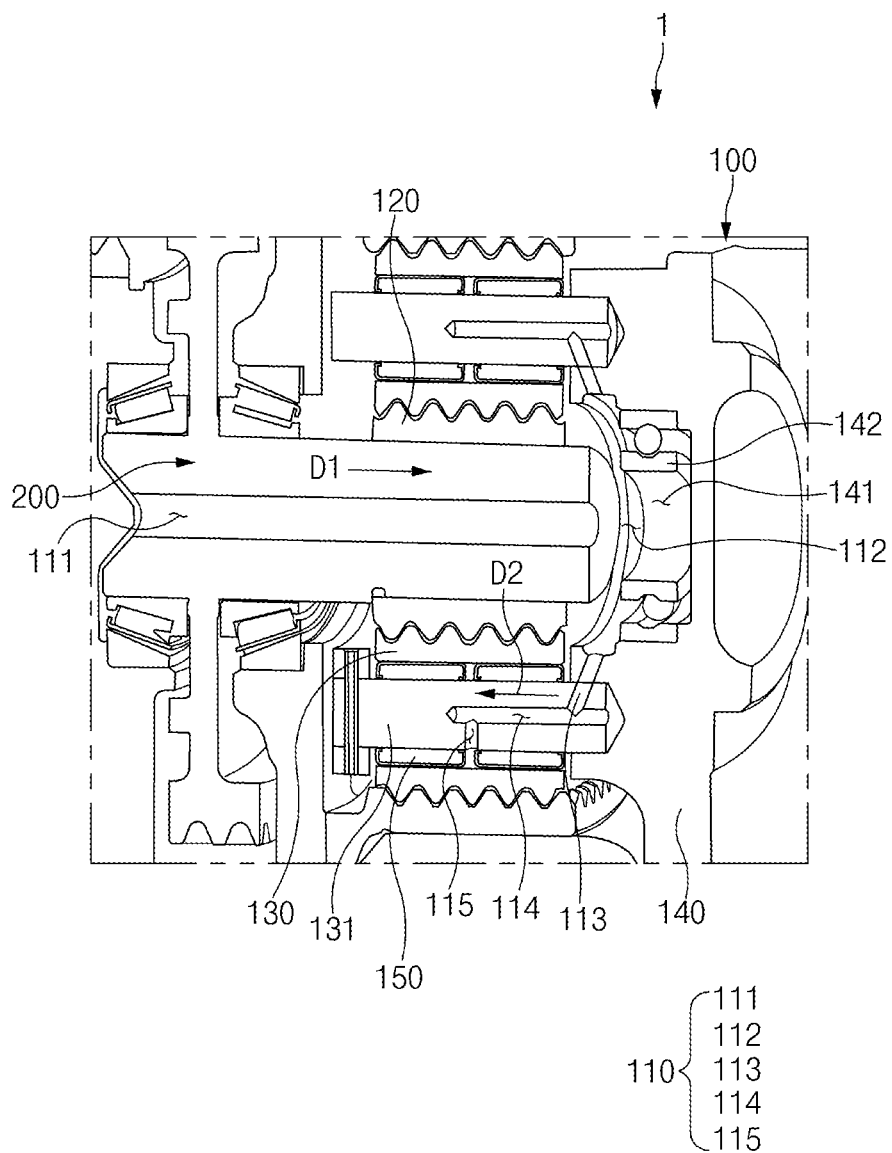
FIG. 1 is an enlarged cross-sectional view illustrating a portion of an in-wheel driving apparatus, at which a first planetary gear reducer is located, according to an embodiment of the present disclosure.

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

FIG. 1 is an enlarged perspective view illustrating one cross-section of an in-wheel driving apparatus according to an embodiment of the present disclosure.

An in-wheel driving apparatus according to an embodiment of the present disclosure relates to an in-wheel driving apparatus that has a flow passage structure, in which oil may flow efficiently. As illustrated in FIG. 1, an in-wheel driving apparatus 1 according to an embodiment of the present disclosure may include a first planetary gear reducer 100. The first planetary gear reducer 100 may receive a rotational force and transmits the rotational force to the outside after decreasing a rotational angular velocity and increasing a torque.

A flow passage 110 may be formed in an interior of the first planetary gear reducer 100. According to the present disclosure, the oil introduced into the first planetary gear reducer 100 through the flow passage 110 may flow an introduction direction, and then may flow a direction that is opposite to the introduction direction. That is, according to the present disclosure, a flow path of the oil formed in the in-wheel driving apparatus 1 may have a "U" shape.

A conventional in-wheel driving apparatus has many components mounted thereon and thus there are many restrictions on constitution of a package, so that the flow passage structure of the oil for cooling and lubrication is complex, and accordingly, a manufacturing process thereof is also complex. However, according to the present disclosure, because the flow passage 110 having the "U" shape is formed in the interior of the in-wheel driving apparatus 1, the flow passage 110 may satisfy an internal package condition and has a simplified structure.

The in-wheel driving apparatus 1 may further include a first shaft 200. The first shaft 200 may be a transfer gear that may receive power from the outside and transmit power to the first planetary gear reducer 100. A first flow passage 111, into which the oil is introduced, may be formed in an interior of the first shaft 200.

The first planetary gear reducer 100 may include a sun gear 120, a planetary gear 130, and a carrier 140. The sun gear 120 may be coupled to an outer side of the first shaft 200 to receive power from the first shaft 200 to be rotated.

The planetary gear 130 may be provided on an outer side of the sun gear 120 to be engaged with the sun gear 120. A plurality of planetary gears 130 may be provided. The planetary gear 130 may include a second shaft 131. The second shaft 131 may be a shaft that is parallel to the first shaft 200. The planetary gear 130 may revolve along an outer circumference of the sun gear 120 while rotating about the second shaft 131.

The carrier 140 may be coupled to the second shaft 131. The carrier 140 may rotate in conjunction with the revolution of the second shaft 131.

The first planetary gear reducer 100 may further include a second flow passage 112. The second flow passage 112 may be communicated with the first flow passage 111, and may be formed on one side of the carrier 140. In more detail, the second flow passage 112, as illustrated in FIG. 1, may be formed between the first shaft 200 and the carrier 140.

Meanwhile, the carrier 140 may include a carrier interior space 141 communicated with the second flow passage 112. Accordingly, according to the present disclosure, a portion of the oil introduced from the first flow passage 111 to the second flow passage 112 may be introduced into the carrier interior space 141.

The carrier 140 may further include a first bearing 142. The first bearing 142 may be disposed in the carrier interior space 141. A portion of the oil introduced from the first flow passage 111 to the second flow passage 112 may be introduced into the first bearing 142. The oil introduced into the first bearing 142 may cool and lubricate the first bearing 142.

The second shaft 131 may include a third flow passage 113. The third flow passage 113 may be communicated with the second flow passage 112. Accordingly, the oil discharged from the second flow passage 112 may be introduced into the third flow passage 113.

The first planetary gear reducer 100 may further include a second bearing 150. The second bearing 150 may be disposed on a radially outer side of the second shaft 131. The oil discharged from the third flow passage 113 may be introduced into the second bearing 150. The second bearing 150 may be a needle bearing. The second bearing 150 may be disposed on an outer side of the second shaft 131, and may cause the planetary gear 130 to rotate smoothly. The number of the second bearings 150 may correspond to the number of the second shafts 131.

The second shaft 131 may further include a fourth flow passage 114 and a fifth flow passage 115. The fourth flow passage 114 may be communicated with the third flow passage 113, and may extend along a lengthwise direction of the second shaft 131. The fifth flow passage 115 may be communicated with the fourth flow passage 114, and may guide the oil discharged from the fourth flow passage 114 to the second bearing 150. That is, the oil may be guided from the first flow passage 111 to the fifth flow passage 115 via the second flow passage 112, the third flow passage 113, and the fourth flow passage 114. Meanwhile, FIG. 1 illustrates that one lengthwise end area of the fourth flow passage 114 and the third flow passage 113 are communicated with each other and an opposite lengthwise end area of the fourth flow passage 114 and the fifth flow passage 115 are communicated with each other.

According to the present disclosure, a first direction D1 that is a direction, in which the oil passes through the first flow passage 111, and a second direction D2 that is a direction, in which the oil passes through the fourth flow passage 114, may be opposite to each other. Because the first direction D1 and the second direction D2 are opposite to each other, the "U"-shaped flow passage (100) structure for the oil may be secured in the in-wheel driving apparatus 1. The "U"-shaped flow passage may refer to a flow passage formed by the first flow passage 111, the second flow passage 112, the third flow passage 113, and the fourth flow passage 114.

The third flow passage 113 may be inclined in a direction that faces the fifth flow passage 115. The fifth flow passage 115 may extend from one lengthwise end of the fourth flow passage 114, and the third flow passage 113 may extend from an opposite lengthwise end of the fourth flow passage 114. Furthermore, the shape, in which the third flow passage 113, the fourth flow passage 114, and the fifth flow passage 115 are connected to each other, as illustrated in FIG. 1, may have a stepped structure.

A portion of the oil discharged from the fifth flow passage 115 may be introduced into the second bearing 150 in a direction that is parallel to the first direction D1, and another portion of the oil discharged from the fifth flow passage 115 may be introduced into the second bearing 150 in a direction that is parallel to the second direction D2. That is, the oil discharged from the fifth flow passage 115 may be divided to the left and right sides with respect to a direction, in which the oil is discharged, and then may be introduced into the second bearing 150. The oil introduced into the second bearing 150 may cool and lubricate the second bearing 150.

Figure 3:
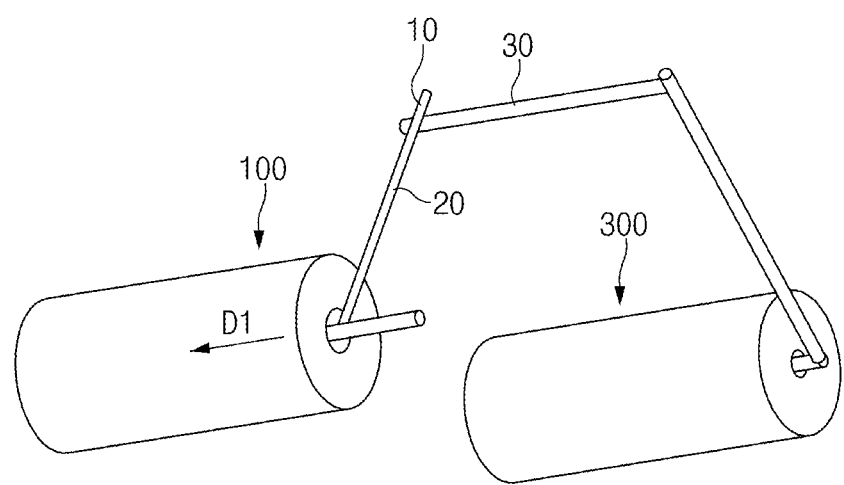
FIG. 3 is a perspective view conceptually illustrating a main line, a first line, a second line, a first planetary gear reducer, and a second planetary gear reducer of an in-wheel driving apparatus according to an embodiment of the present disclosure.

FIG. 3 is a perspective view conceptually illustrating a main line, a first line, a second line, a first planetary gear reducer, and a second planetary gear reducer of an in-wheel driving apparatus according to an embodiment of the present disclosure.

Figure 2:
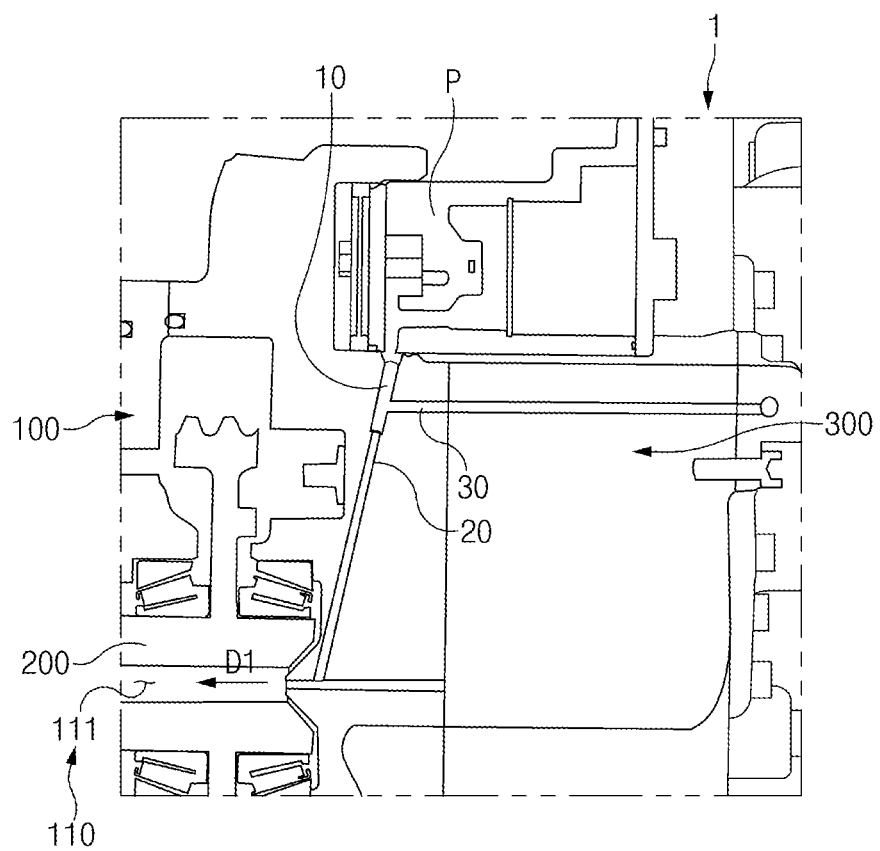
FIG. 2 is an enlarged cross-sectional view illustrating portions of an in-wheel driving apparatus, at which an oil pump, a main line, a first line, and a second line are located, according to an embodiment of the present disclosure.

The in-wheel driving apparatus 1 according to an embodiment of the present disclosure may further include an oil pump "P", a second planetary gear reducer 300, a main line 10, a first line 20, and a second line 30. FIG. 2 is an enlarged cross-sectional view illustrating portions of an in-wheel driving apparatus, at which an oil pump, a main line, a first line, and a second line are located, according to an embodiment of the present disclosure. The oil pump "P" may discharge the oil used for lubrication and cooling. The second planetary gear reducer 300 may be disposed on one side of the first planetary gear reducer 100. The second planetary gear reducer 300 may be connected to a motor that supplies power. The second planetary gear reducer 300 may be connected to the first planetary gear reducer 100 by the first shaft 200.

In more detail, the motor may transmit a rotational force to the second planetary gear reducer 300, and the second planetary gear reducer 300 may transmit the rotational force to the first planetary gear reducer 100. The second planetary gear reducer 300 that received the rotational force from the motor may transmit the power to the first shaft 200 after decreasing the rotational angular velocity. Thereafter, the first shaft 200 may transmit the power to the first planetary gear reducer 100, and the first planetary gear reducer 100 that received the power from the first shaft 200 may transmit the power to the outside after decreasing the rotational angular velocity once more.

The main line 10 may be configured such that the oil discharged from the oil pump "P" is introduced into the first planetary gear reducer 100 and the second planetary gear reducer 300. The first line 20 may be communicated with the main line 10.

The first line 20 may be configured to supply the oil to the first planetary gear reducer 100. The second line 30 may be communicated with the main line 10, and may be configured to supply the oil to the second planetary gear reducer 300. According to the present disclosure, because the first line 20 and the second line 30 are branched from the main line 10 to supply the oil to the planetary gear reducers 100 and 200, a constant amount of the oil may be supplied.

Meanwhile, a direction, in which the main line 10 extends, and a direction, in which the first line 20 extends, may be parallel to each other. That is, as illustrated in FIG. 2, the direction, in which the oil flows through the main line 10, and the direction, in which the oil flows through the first line 20, may be parallel to each other. To the contrary, the second line 20 may extend in a direction that crosses the direction, in which the main line 10 extends. That is, the direction, in which the oil flows through the first line 20, and the direction, in which the oil flows through the second line 30, may cross each other.

Meanwhile, as described above, when the direction, in which the main line 10 extends, and the direction, in which the first line 20 extends, are parallel to each other and the direction, in which the second line 30 extends, and the direction, in which the main line 10 extends, cross each other, a larger amount of the oil may be introduced into the first line 20 due to the inertia of the oil. In this case, a larger amount of the oil may be introduced into the first line 20 than into the second line 30, and this may cause an unbalance of the flow rates of the oil that flows through the first line 20 and the oil that flows through the second line 30.

To prevent this, according to the present disclosure, a diameter of the first line 20 may be smaller than a diameter of the second line 30. Accordingly, according to the present disclosure, the unbalance of the flow rate of the oil introduced into the first line 20 and the flow rate of the oil introduced into the second line 30 may be solved.

Hereinafter, an in-wheel driving apparatus and a vehicle according to another embodiment of the present disclosure will be described with reference to FIGS. 4 and 5.

In-Wheel Driving Apparatus

Figure 4:
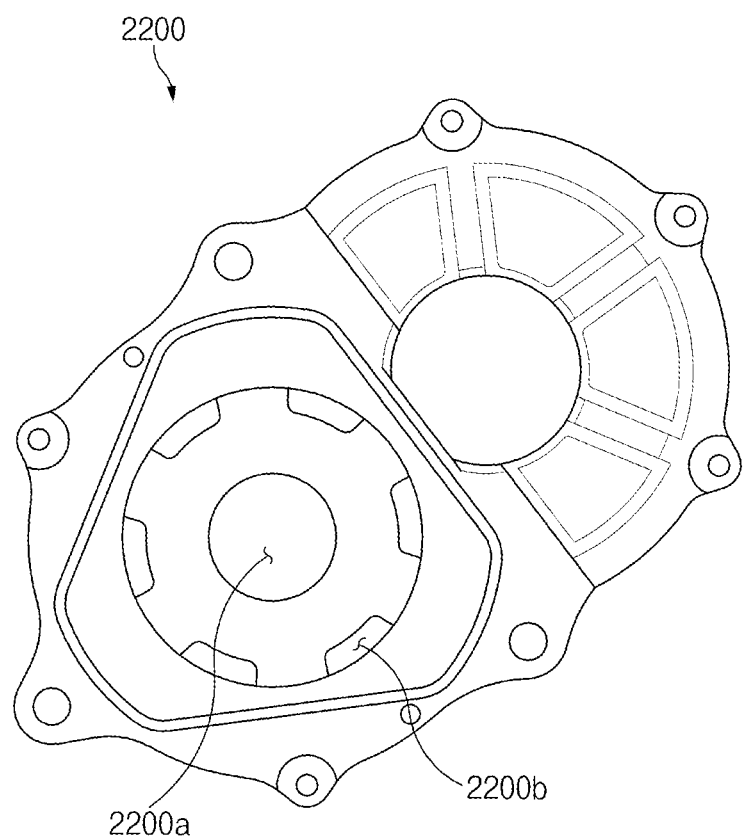
FIG. 4 is a side view illustrating a structure of a cover provided in an in-wheel driving apparatus according to another embodiment of the present disclosure.

FIG. 4 is a side view illustrating a structure of a cover provided in an in-wheel driving apparatus according to another embodiment of the present disclosure. FIG. 5 is a cross-sectional view illustrating an in-wheel driving apparatus according to another embodiment of the present disclosure.

An in-wheel driving apparatus 1' according to another embodiment of the present disclosure may include a first planetary gear reducer 2100. The first planetary gear reducer 2100 may be a configuration of receiving a rotational force to decrease a rotational speed and increase a rotational torque.

The first planetary gear reducer 2100 may include a sun gear 2110, and a first planetary gear 2120 provided on an outer side of the first sun gear 2110 and engaged with the first sun gear 2110. Then, a plurality of first planetary gears 2120 may be provided.

Furthermore, the first planetary gear reducer 2100 may further include a first carrier 2130 coupled to the plurality of first planetary gears 2120, and a first ring gear 2140 provided on an outer side of the plurality of first planetary gears 2120 and engaged with the plurality of first planetary gears 2120. When the first sun gear 2110 that received a rotational force from the outside rotates, the first planetary gears 2120 engaged with the first sun gear 2110 rotate about the first sun gear 2110 while revolving along an outer circumference of the first sun gear 2110. Then, the first carrier 2130 engaged with the plurality of first planetary gears 2120 may rotate at the same angular speed as the angular speed of the revolution of the first planetary gears 2120. Then, the first ring gear 2140 may be fixed while not rotating. Meanwhile, in the specification, a direction, in which the first sun gear 2110, the first planetary gears 2120, and the first ring gear 2140 are arranged, is defined as a radial direction "R" of the in-wheel driving apparatus 1'.

Figure 5:
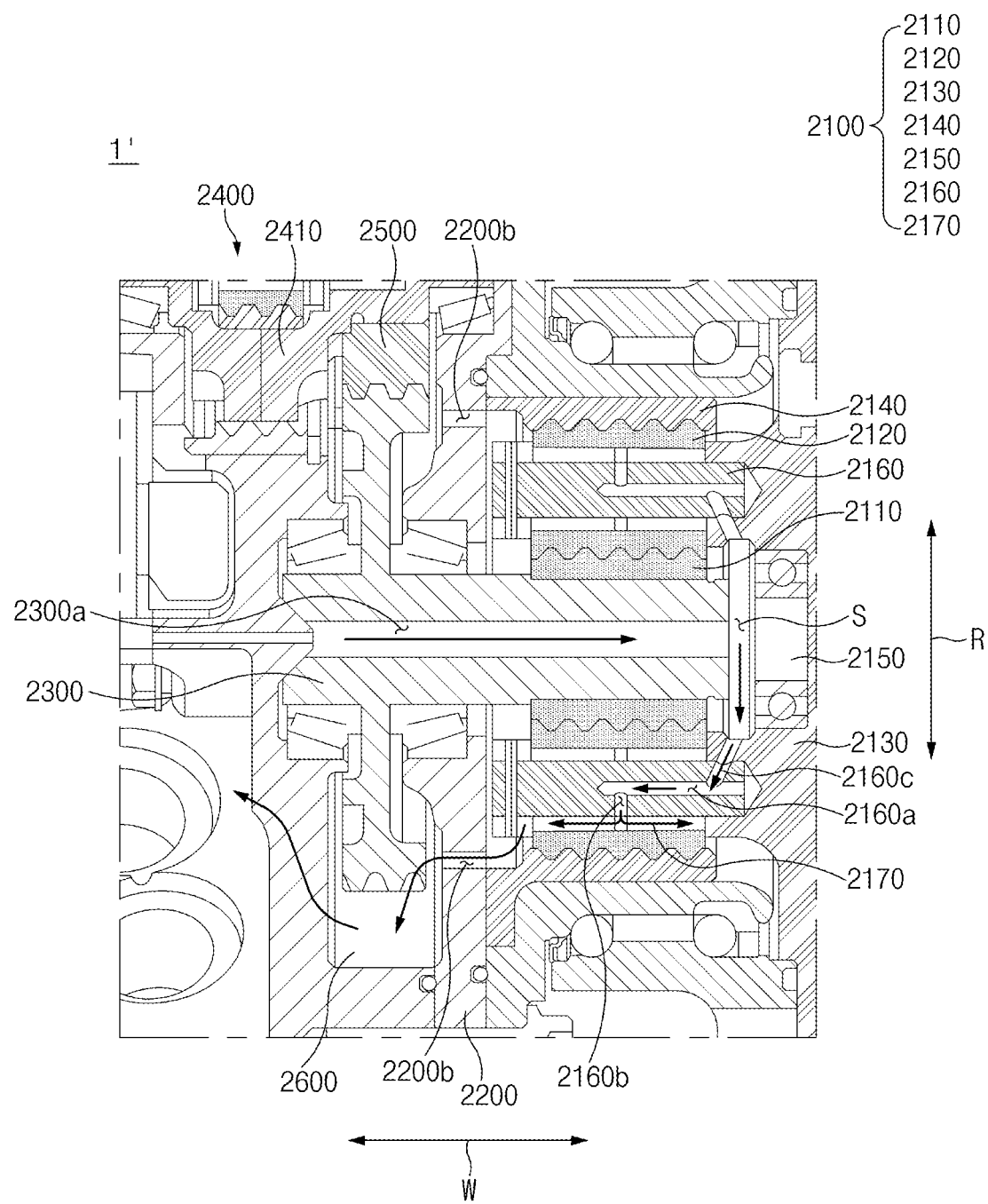
FIG. 5 is a cross-sectional view illustrating an in-wheel driving apparatus according to another embodiment of the present disclosure.

Meanwhile, as illustrated in FIGS. 4 and 5, the in-wheel driving apparatus 1' according to the second embodiment of the present disclosure may further include a cover 2200, one side of which faces the first planetary gear reducer 2100. FIG. 5 illustrates a state, in which the cover 2200 is provided on a left side of the first planetary gear reducer 2100.

Furthermore, the in-wheel driving apparatus 1' may further include a transfer gear 2300 that passes through the cover 2200. Meanwhile, in the specification, a direction, in which the transfer gear 2300 extends while passing through the cover 2200 is defined as a widthwise direction "W" of the in-wheel driving apparatus 1'. Then, the transfer gear 2300 may extend in the widthwise direction "W" and may face the first carrier 2130 while being spaced apart from the first carrier 2130 at a specific interval. Accordingly, a space may be formed between the transfer gear 2300 and the carrier 2130.

The transfer gear 2300 may be coupled to the first sun gear 2110 of the first planetary gear reducer 2100. In more detail, the first sun gear 2110 may be coupled to an outer surface of the transfer gear 2300 in the radial direction "R". The transfer gear 2300 may be a configuration for providing a rotational force to the first sun gear 2110. In more detail, the first sun gear 2110 may rotate in the same angular speed as that of the transfer bear 2300.

Meanwhile, a flow passage that provides a path, along which the oil may flow, may be formed in an interior of the transfer gear 2300. In more detail, a gear flow passage 2300a that extends along the widthwise direction "W" may be formed in the interior of the transfer gear 2300. The oil may be supplied to the first planetary gear reducer 2100 through the gear flow passage 2300*a*, and the oil supplied in this way may cool and lubricate the first planetary gear reducer 2100.

Referring now to FIG. 5, the transfer gear 2300 may include an area that extends in the radial direction "R" in an area thereof. Then, the in-wheel driving apparatus 1' may further include a circumscribed gear 2500 engaged with the transfer gear 2300 on an outer side of the extending area, and a second planetary gear reducer 2400 coupled to the circumscribed gear 2500.

In more detail, the second planetary gear reducer 2400 may include a second carrier 2410, and the circumscribed gear 2500 may be coupled to the second carrier 2410. Furthermore, although not illustrated, similar to the first planetary gear reducer 2100, the second planetary gear reducer 2400 may further include a second sun gear (not illustrated), a plurality of second planetary gears (not illustrated), and a second ring gear (not illustrated).

Furthermore, the in-wheel driving apparatus according to the second embodiment of the present disclosure may further include a motor (not illustrated) including a rotor and a stator. Then, the rotor of the motor may be connected to the second sun gear of the second planetary gear reducer, and when the rotor is rotated, the second sun gear also is rotated at the same rotational angular speed as that of the rotor, and a rotational force supplied to the second sun gear is transmitted to the second carrier 2410 via the second planetary gears in a primarily reduced speed state. Meanwhile, because the second carrier 2410 is coupled to the circumscribed gear 2500, the circumscribed gear 2500 also rotates while the second carrier 2410 rotates. The rotational force of the circumscribed gear 2500 is transmitted to the transfer gear 2300, and the first planetary gear reducer 2100 that received the rotational force of the transfer gear 2300 transmits the rotational force to the first carrier 2130 via the first sun gear 2110 and the first planetary gears 2120 in a secondarily reduced speed state.

Meanwhile, a plurality of holes may be formed in the cover 2200 of the in-wheel driving apparatus 1' according to the second embodiment of the present disclosure. In more detail, a gear hole 2200*a* that passes through opposite surfaces of the cover and a flow passage hole 2200*b* may be formed in the cover 2200. The gear hole 2200*a* may be an area that passes through the transfer gear 2300. That is, the transfer gear 2300 may pass through the cover 2200 through the gear hole 2200*a*.

The flow passage hole 2200*b* may be a path, along which the oil supplied into the interior of the first planetary gear reducer 2100 is discharged to the outside. Accordingly, according to the present disclosure, an opposite side provided on an opposite side of the one side, on which the cover 2200 faces the first planetary gear reducer 2100, and the first planetary gear reducer 2100 may be communicated with each other by the flow passage hole 2200*b* formed in the cover 2200.

As illustrated in FIG. 4, a plurality of flow passage holes 2200*b* may be provided. In more detail, the plurality of flow passage holes 2200*b* may be provided along a circumference of the gear hole 2200*a* at an equal interval. As an example, FIG. 4 illustrates a state, in which six flow passage holes 2200*b* are provided along the circumference of the gear hole 2200*a*.

According to the present disclosure, because the flow passage holes 2200*b* are formed in the cover 2200, an oil circulation line, through which the oil supplied into the interior of the first planetary gear reducer 2100 through the transfer gear 2300 again, may be formed. That is, according to the present disclosure, the oil may be supplied to the first planetary gear reducer 2100 through the gear flow passage 2300*a* formed in the transfer gear 2300, and the oil that performed the cooling and lubrication functions in the first planetary gear reducer 2100 may be discharged to the outside of the first planetary gear reducer 2100 via the flow passage hole 2200*b* formed in the cover 2200. Hereinafter, the flow passage circulation line provided in the in-wheel driving apparatus according to the second embodiment of the present disclosure will be described below.

Referring to FIG. 5, the transfer gear 2300 and the first carrier 2130 may be spaced apart from each other in the widthwise direction "W" to form a specific space "S" (hereinafter, referred to as 'a spacing flow passage space'). The spacing flow passage space "S" may be a configuration that is communicated with the gear flow passage 2300*a* formed in the transfer gear 2300. Accordingly, the oil supplied from the outside through the gear flow passage 2300*a* may be introduced into the gear flow passage 2300*a*.

Furthermore, the first planetary gear reducer 2100 may further include a carrier bearing 2150 provided in an interior of the first carrier 2130. Then, the carrier bearing 2150, as illustrated in FIG. 5, may face the gear flow passage 2300*a* while the spacing flow passage space "S" being interposed therebetween. In this case, the oil that flows through the gear flow passage 2300*a* may be smoothly supplied into the interior of the carrier bearing 2150.

Meanwhile, the first planetary gear reducer 2100 may further include a rotary shaft 2160 provided on an inner side of the first planetary gear 2120, and a planetary gear bearing 2170 provided between the first planetary gear 2120 and the rotary shaft 2160 in the radial direction "R".

Then, a flow passage, through which the oil may flow, may be formed in the rotary shaft 2160. In more detail, a first rotary shaft flow passage 2160*a* having a shape that extends in the widthwise direction "W" may be formed in an interior of the rotary shaft 2160, and a second rotary shaft flow passage 2160*b* formed between the first rotary shaft flow passage 2160*a* and the planetary gear bearing 2170 and that communicates the first rotary shaft flow passage 2160*a* and the planetary gear bearing 2170 may be formed. Furthermore, a third rotary shaft flow passage 2160*c* provided between the first rotary shaft flow passage 2160*a* and the spacing flow passage space "S" and that communicates the first rotary shaft flow passage 2160*a* and the spacing flow passage space "S" may be formed.

Referring to FIG. 5, the second rotary shaft flow passage 2160*b* may have a shape that extends in the radial direction "R", and may have a shape that extends from one end of the first rotary shaft flow passage 2160*a*. More preferably, the second rotary shaft flow passage 2160*b* may meet the first rotary shaft flow passage 2160*a* perpendicularly thereto. Furthermore, the oil discharged from the second rotary shaft flow passage 2160*b* may be introduced into the interior space of the planetary gear bearing 2170 after being branched in the widthwise direction "W". To achieve this, one end of the second rotary shaft flow passage 2160*b* may face a central area of the planetary gear bearing 2170 in the widthwise direction "W".

Furthermore, the third rotary shaft flow passage 2160*c* may have a shape that extends from an opposite end of the first rotary shaft flow passage 2160*a*. Then, unlike the second rotary shaft flow passage 2160*b,* the third rotary shaft flow passage 2160*c* may be inclined. In more detail, the third rotary shaft flow passage 2160*c* may be extend between the first rotary shaft flow passage 2160*a* and the spacing flow passage space "S" obliquely in an inclined direction with respect to the radial direction "R" and the widthwise direction "W". More preferably, the third rotary shaft flow passage 2160c may extend obliquely in a direction that faces the second rotary shaft flow passage 2160b.

In summary of the above descriptions, flows of the oil in the rotary shaft 2160 will be described as follows. In the oil introduced into the spacing flow passage space "S", the remaining oil except for the oil introduced toward the carrier bearing 2150 is introduced into the third rotary shaft flow passage 2160c, and the oil introduced into the third rotary shaft flow passage 2160c is introduced into the planetary gear bearing 2170 via the first rotary shaft flow passage 2160a and the second rotary shaft flow passage 2160b.

Meanwhile, as illustrated in FIG. 5, the interior space of the planetary gear bearing 2170 may be communicated with the first rotary shaft flow passage 2160a a through the second rotary shaft flow passage 2160b, and may be communicated with the flow passage hole 2200b formed in the cover 2200 as well. Accordingly, the oil introduced into the interior space of the planetary gear bearing 2170 may be discharged to the outside through the flow passage hole 2200b.

Referring now to FIG. 5, a storage space may be formed in an outer area of the transfer gear 2300 in the radial direction "R" in the area that faces an opposite side to the one side of the cover 2200, which faces the first planetary gear reducer 2100. Then, the spacing flow passage space "S", and the first to third rotary shaft flow passages 160a, 160b, and 160c may be communicated with the storage space through the flow passage hole 2200b. Accordingly, the storage space may be a space, into which the oil discharged from the first planetary gear reducer 2100 is introduced through the flow passage hole 2200b.

Meanwhile, the in-wheel driving apparatus 1 may further include a housing 2600 that accommodates the circumscribed gear 2500, and the above-described storage space may be formed in an interior of the housing 2600. That is, the housing 2600 may accommodate the circumscribed gear 2500, and may perform a function of providing a space, into which the discharged oil is introduced through the flow passage hole 2200b.

Furthermore, the in-wheel driving apparatus 1' may further include an oil pump (not illustrated) that supplies the oil to the gear flow passage 2300b of the transfer gear 2300, and the oil that performed the cooling and lubrication functions in the interior of the first planetary gear reducer 2100 may be supplied to the oil pump again after being introduced into the storage space via the flow passage hole 2200b. Accordingly, an oil circulation line, in which the oil discharged from the oil ump may be introduced into the oil pump, may be formed.

Vehicle

A vehicle according to the present disclosure may include wheels and an in-wheel driving apparatus 1 and 1' provided in the wheels. Then, the in-wheel driving apparatus may include a first planetary gear reducer 2100, and a cover 2200, one side of which faces the first planetary gear reducer 2100.

Furthermore, a flow passage hole 2200b that passes through opposite surfaces of the cover 2200 may be formed in the cover 2200, and the first planetary gear reducer 2100 may be communicated with an opposite side of the one side of the cover 2200 by the flow passage hole 2200b formed in the cover 2200.

According to the present disclosure, the flow passage may satisfy an internal package condition and may be simplified through the flow passage structure configured such that the oil may flow in a "U" shape.

In addition, according to the present disclosure, because the flow passage, through which the oil is introduced into the planetary gear reducers, is divided at an intermediate point of the main line, a constant amount of the oil may be supplied to the planetary gear reducers.

Furthermore, according the present disclosure, a structure, in which oil that is introduced into an interior of a reducer of an in-wheel system to perform cooling and lubrication functions may circulate, may be provided to allow the oil to be smoothly reused.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. An in-wheel driving apparatus comprising:
   a first planetary gear reducer into which oil is introduced; and
   a first shaft configured to transmit power to the first planetary gear reducer, and including a first flow passage, into which the oil is introduced, formed therein,
   wherein the first planetary gear reducer includes:
      a sun gear coupled to an outer side of the first shaft and configured to receive the power from the first shaft to be rotated;
      a planetary gear engaged with the sun gear, including a second shaft that is parallel to the first shaft, and configured to revolve along an outer circumference of the sun gear while rotating about the second shaft; and
      a carrier coupled to the second shaft, and configured to rotate in conjunction with the revolution of the second shaft,
   wherein the second shaft includes a plurality of flow passages communicated with the first flow passage, and
   the plurality of flow passages is configured such that the oil introduced into the first planetary gear reducer flows in an introduction direction, and flows through one of the plurality of flow passages in a direction that is opposite to the introduction direction thereafter.

2. The in-wheel driving apparatus of claim 1, further comprising:
   a second flow passage communicated with the first flow passage and formed on one side of the carrier, and
   wherein the carrier includes:
      a carrier interior space communicated with the second flow passage, and
   wherein a portion of the oil introduced from the first flow passage to the second flow passage is introduced into the carrier interior space.

3. The in-wheel driving apparatus of claim 2, wherein the carrier further includes:
   a first bearing disposed in the carrier interior space, and wherein a portion of the oil introduced from the first flow passage to the second flow passage is introduced into the first bearing.

4. The in-wheel driving apparatus of claim 3, wherein the plurality of flow passages of the second shaft includes:
a third flow passage communicated with the second flow passage, and
wherein the oil discharged from the second flow passage is introduced into the third flow passage.

5. The in-wheel driving apparatus of claim 4, wherein the first planetary gear reducer further includes:
a second bearing disposed on an outer side of the second shaft, and
wherein the oil discharged from the third flow passage is introduced into the second bearing.

6. The in-wheel driving apparatus of claim 5, wherein the plurality of flow passages of the second shaft further includes:
a fourth flow passage communicated with the third flow passage and extending along a lengthwise direction of the second shaft; and
a fifth flow passage communicated with the fourth flow passage, and configured to guide the oil discharged from the fourth flow passage to the second bearing,
wherein a first direction, in which the oil passes through the first flow passage, and a second direction, in which the oil passes through the fourth flow passage, are opposite to each other, and
wherein the third flow passage is inclined in a direction that faces the fifth flow passage.

7. The in-wheel driving apparatus of claim 6, wherein the fifth flow passage extends from one end thereof in a direction, in which the fourth flow passage extends, and
wherein a portion of the oil discharged from the fifth flow passage is introduced into the second bearing in a direction that is parallel to the first direction, and a portion of the oil discharged from the fifth flow passage is introduced into the second bearing in a direction that is parallel to the second direction.

8. The in-wheel driving apparatus of claim 1, further comprising:
an oil pump configured to discharge the oil;
a second planetary gear reducer disposed on one side of the first planetary gear reducer;
a main line, into which the oil discharged from the oil pump is introduced;
a first line communicated with the main line and configured to supply the oil to the first planetary gear reducer; and
a second line communicated with the main line and configured to supply the oil to the second planetary gear reducer,
wherein a diameter of the first line is smaller than a diameter of the second line,
wherein a direction, in which the main line extends, and a direction, in which the first line extends, are parallel to each other, and
wherein the second line extends in a direction that crosses the direction, in which the main line extends.

9. An in-wheel driving apparatus comprising:
a first planetary gear reducer;
a cover having one side which faces the first planetary gear reducer; and
a transfer gear extending in a widthwise direction (W) of the in-wheel driving apparatus, and passing through the cover, wherein the cover includes a flow passage hole formed therein and passing through opposite surfaces of the cover,
wherein the first planetary gear reducer is communicated with an opposite side of the one side of the cover by the flow passage hole formed in the cover,
wherein a gear hole, through which the transfer gear passes, is formed in the cover,
wherein a gear flow passage extending along the widthwise direction (W) is formed in an interior of the transfer gear, and
wherein the gear flow passage is communicated with the flow passage hole, and is spaced apart from the flow passage hole in a radial direction (R) of the in-wheel driving apparatus.

10. The in-wheel driving apparatus of claim 9, wherein the first planetary gear reducer includes:
a first sun gear coupled to an outer surface of the transfer gear;
a plurality of first planetary gears disposed on an outer side of the first sun gear and engaged with the first sun gear;
a first carrier coupled to the plurality of first planetary gears and configured to face the transfer gear; and
a carrier bearing disposed in an interior of the first carrier,
wherein the transfer gear and the first carrier are spaced apart from each other in the widthwise direction (W) to form a spacing flow passage space therebetween,
wherein the gear flow passage is communicated with the flow passage hole through the spacing flow passage space, and
wherein the carrier bearing is configured to face the gear flow passage while the spacing flow passage space being interposed therebetween.

11. The in-wheel driving apparatus of claim 10, wherein a storage space is formed in an outer area of the transfer gear in the radial direction (R), in an area that faces the opposite side of the cover, and
wherein the spacing flow passage space is communicated with the storage space through the flow passage hole.

12. The in-wheel driving apparatus of claim 11, further comprising:
a circumscribed gear engaged with the transfer gear on an outer side of the transfer gear; and
a housing accommodating the circumscribed gear,
wherein the storage space is formed in an interior of the housing.

13. The in-wheel driving apparatus of claim 12, further comprising:
a second planetary gear reducer coupled to the circumscribed gear,
wherein the second planetary gear reducer includes:
a second carrier, and
wherein the circumscribed gear is coupled to the second carrier.

14. The in-wheel driving apparatus of claim 11, wherein the first planetary gear reducer includes:
a rotary shaft disposed in an inner side of the first planetary gear; and
a first rotary shaft flow passage extending in the widthwise direction (W) and formed in an interior of the rotary shaft.

15. The in-wheel driving apparatus of claim 14, wherein the first planetary gear reducer further includes:
a planetary gear bearing disposed between the first planetary gear and the rotary shaft in the radial direction (R), and wherein an interior of the planetary gear bearing is communicated with the flow passage hole and the first rotary shaft flow passage.

16. The in-wheel driving apparatus of claim 15, further comprising
a second rotary shaft flow passage that communicates the first rotary shaft flow passage and the interior space of the planetary gear bearing and that is formed in an interior of the rotary shaft,
wherein one end of the second rotary shaft flow passage is configured to face a central area of the planetary gear bearing in the widthwise direction (W).

17. The in-wheel driving apparatus of claim 16, further comprising
a third rotary shaft flow passage disposed between the first rotary shaft flow passage and the spacing flow passage space and configured to communicate the first rotary shaft flow passage and the spacing flow passage space,
wherein the third rotary shaft flow passage extends obliquely with respect to the radial direction (R) and the widthwise direction (W).

18. A vehicle comprising:
a wheel; and
an in-wheel driving apparatus disposed in the wheel,
wherein the in-wheel driving apparatus includes:
a first planetary gear reducer;
a cover having one side which faces the first planetary gear reducer; and
a transfer gear extending in a widthwise direction (W) of the in-wheel driving apparatus, and passing through the cover,
wherein the cover includes a flow passage hole formed therein and passing through opposite surfaces of the cover,
wherein the first planetary gear reducer is communicated with an opposite side of the one side of the cover by the flow passage hole formed in the cover,
wherein a gear hole, through which the transfer gear passes, is formed in the cover,
wherein a gear flow passage extending along the widthwise direction (W) is formed in an interior of the transfer gear, and
wherein the gear flow passage is communicated with the flow passage hole, and is spaced apart from the flow passage hole in a radial direction (R) of the in-wheel driving apparatus.

* * * * *